United States Patent Office 3,557,208
Patented Jan. 19, 1971

3,557,208
N-(SUBSTITUTED PHENYL) TRIALKYL
PHOSPHINE IMIDE
Stephen J. Kuhn, Sarnia, Ontario, Canada, assignor to
The Dow Chemical Company, Midland, Mich., a corporation of Delaware
No Drawing. Filed May 8, 1968, Ser. No. 727,690
Int. Cl. C07f 9/28
U.S. Cl. 260—551    4 Claims

ABSTRACT OF THE DISCLOSURE

The present disclosure is directed to N-(substituted phenyl) trialkyl phosphine imides. The method of preparation is taught as well as the use of these compounds as plant growth retarders.

BACKGROUND OF THE INVENTION

It is known that azidobenzenes having orthonitro groups on the benzene ring, upon heating, lose one mole of $N_2$ and give benzofurazan oxides. It has been discovered that if ortho-nitro or fluoroazidobenzenes are heated in the presence of tertiary alkyl phosphines, they give the corresponding N-ortho-nitroaryl or fluoroaryl trialkyl phosphine imides selectively. The compounds of the present invention have outstanding properties as plant growth retarders for terrestrial as well as for fungal plants.

SUMMARY OF THE INVENTION

The present invention is directed to the N-(substituted phenyl) trialkyl phosphine imides of the formula:

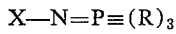

In this and succeeding formulae, R represents an alkyl group of 1–4 carbon atoms, inclusive, and X represents nitrophenyl, dinitrophenyl, trifluorotolyl or fluorophenyl. In the present specification and claims, the terms "nitrophenyl," "trifluorotolyl" and "fluorophenyl" are employed to represent the substituent in the ortho, meta or para position. The term "dinitrophenyl" is employed to represent the nitro substituents in the 2,4 position.

Representative of the above formula are

N-(ortho-nitrophenyl)-P,P,P-tributyl phosphine imide,
N-(2,4-dinitrophenyl)-P,P,P-trimethyl phosphine imide,
N-(2,4-dinitrophenyl)-P,P,P-tributyl phosphine imide,
N-(α,α,α-trifluoro-m-tolyl)-P,P,P-tributyl phosphine
  imide,
N-(p-fluorophenyl)-P,P,P-tributyl phosphine imide,
N-(m-fluorophenyl)-P,P,P-tributyl phosphine imide,
N-(α,α,α-trifluoro-o-tolyl)-P,P,P-tributyl phosphine imide,
N-(α,α,α-trifluoro-o-tolyl)-P,P,P-trimethyl phosphine
  imide,
N-(m-fluorophenyl-P,P,P-triethyl phosphine imide and
N-(α,α,α)-trifluoro-o-tolyl)-P,P,P-tripropyl phosphine
  imide.

In the present specification, the term "nitroazidobenzene" is employed to represent mononitroazidobenzene wherein the nitro substituent is in the ortho, meta or para position and 2,4-dinitroazidobenzene; while the term "fluoroazidobenzene" is employed to represent monofluoroazidobenzene and (trifluoromethyl)azidobenzene wherein the fluoro substituent is in the ortho, meta or para position.

The compounds of the invention are prepared by dissolving an appropriate nitro- or fluoroazidobenzene and a tertiary alkyl phosphine together in a suitable solvent. After a short induction period, a vigorous exothermic reaction takes place with nitrogen gas being evolved. The reaction time is very short and is usually only a few minutes. The solvent is evaporated and an oily liquid product is obtained which has been proven by nuclear magnetic resonance spectroscopy to be an N-(substituted phenyl) tertiary alkyl phosphine imide. The yields are near theoretical.

The compounds of the present invention are more specifically prepared by dissolving a nitro- or fluoro-azidobenzene in an inert organic solvent such as benzene, toluene, halogenated aromatics or alkanes, ethers or esters. The trialkyl phosphine is also dissolved in the same solvent and is added to the azidobenzene solution. The reaction mixture may be heated to accelerate the start of the reaction. After the induction period, nitrogen starts to evolve and the temperature of the reaction may increase, but the reaction temperature is maintained below about 100° C. The temperature may be controlled by regulating the rate of contacting the reactants and by external cooling. The nitrogen evolution slows down a few minutes after contacting the reactants and the reaction is completed in 10 to 30 minutes. The solvent is distilled off and upon cooling, an oily liquid is separated. The oil is filtered, washed with hexane and dried. Other purification means such as distillation by vacuum may be employed.

Some of the desired product is obtained when the nitro- or fluoroazidobenzene and phosphine reactants are contacted in any proportions. Said reactants, however, are consumed in equimolar proportions and the use of equimolar proportions is therefore preferred.

The reactions are carried out at a temperature in the range of from 0° to about 100° C., with an upper limit being maintained around 100° C., since at about this temperature, undesirable by-products start to form. The preferred temperature is between 0° and 60° C. Since nitrogen gas is evolved as a by-product of the reaction, it is desirable to carry out the reaction at pressures at or below atmospheric pressure.

DESCRIPTION OF THE PREFERRED EMBODIMENTS

The following examples illustrate the present invention but are not to be construed as limiting the same.

EXAMPLE 1

N-(ortho-nitrophenyl)-P,P,P-tri-n-butyl phosphine imide 10.1 grams (0.05 mole) of tri-n-butyl phosphine and 8.2 grams (0.05 mole) of o-nitroazidobenzene were dissolved in 150 milliliters of benzene. The nitrogen evolution was slow at room temperature; for this reason, the reaction mixture was slowly heated up to the boiling point of benzene (80.3° C.) and refluxed for 10 minutes. The solvent was distilled off and a dark red oil was left. This oil was then distilled under reduced pressure and the N-(o-nitrophenyl)-P,P,P-tri-n-butyl phosphine imide product was recovered. The product, having a molecular weight of 338, was obtained in a yield of 15.9 grams (99 percent) with a boiling point of 215°–220° C. at 2.2 mm. of mercury and had a refractive index $n_D^{25}=1.5395$. The product was further found by analysis to have carbon, hydrogen and nitrogen contents of 63.4, 9.16 and 8.13 percent, respectively, as compared with the theoretical contents of 63.9, 9.24 and 8.28 percent, respectively, calculated for the named structure.

EXAMPLE 2

N-(2,4-dinitrophenyl)-P,P,P-trimethyl phosphine imide 11 grams (0.05 mole) of 2,4-dinitroazidobenzene and 3.80 grams (0.05 mole) of trimethyl phosphine are dissolved in 150 milliliters of benzene. A deep colored solution is obtained. $N_2$ evolution starts after a short induction period. Towards the end of the reaction, the reaction mixture is heated over a water bath at 60° C. for about 10 minutes. After cooling, the solvent is evaporated and the N - (2,4 - dinitrophenyl) - P,P,P - trimethyl phosphine imide product, having a molecular weight of 257, is separated, washed and dried.

EXAMPLE 3

N-(m-fluorophenyl)-P,P,P-tributyl phosphine imide 6.85 grams (0.05 mole) of m-fluoroazidobenzene and 10.1 grams (0.05 mole) of tributyl phosphine were dissolved in 150 milliliters of benzene. A vigorous reaction started at room temperature and was complete in 10 minutes. The benzene was removed by distillation at atmospheric pressure. The residue, a dark oil, was distilled under reduced pressure. The N-(m-fluorophenyl)-P,P,P-tributyl phosphine imide product, having a molecular weight of 311, was obtained as a yellow liquid, in a yield of 89 percent (14 grams) and had a boiling point of 190°–192° C. under a pressure of 1.8 mm. of mercury. The product was found to have a refractive index $n_D^{25} = 1.5243$ and to have carbon, hydrogen and nitrogen contents of 68.6, 9.7 and 4.5 percent, respectively, as compared with the theoretical contents of 69.4, 10.0 and 4.5 percent, respectively, calculated for the named structure.

EXAMPLE 4

N-($\alpha,\alpha,\alpha$-trifluoro-m-tolyl)-P,P,P-tri-n-butyl phosphine imide 10.1 grams (0.05 mole) of tri-n-butyl phosphine and 9.35 grams (0.05 mole) of m-($\alpha,\alpha,\alpha$-trifluoromethyl)azidobenzene were mixed in 200 milliliters of chloroform. The solution turned dark on mixing and $N_2$ gas was evolved. The reaction was complete in 10 minutes. The solvent was distilled off leaving a residual dark oil. This oil was distilled under reduced pressure and the N-($\alpha,\alpha,\alpha$-trifluoro-m-tolyl)-P,P,P-tri-n-butyl phosphine imide product, having a molecular weight of 431, was recovered. The product was obtained in a yield of 90 percent (17.51 grams) and had a boiling point of 181°–185° C. at 1.5 millimeters of mercury. The product was a yellow liquid and had a refractive index $n_D^{25} = 1.5005$. The product was further found by analysis to have carbon, hydrogen and nitrogen contents of 62.8, 8.55 and 4.0 percent, respectively, as compared with the theoretical contents of 63.1, 8.65 and 3.88 percent, respectively, calculated for the named structure.

EXAMPLE 5

N-($\alpha,\alpha,\alpha$-trifluoro-o-tolyl)-P,P,P-trimethyl phosphine imide 9.35 grams (0.05 mole) of o-($\alpha,\alpha,\alpha$-trifluoromethyl) azidobenzene and 3.80 grams (0.05 mole) of trimethyl phosphine are dissolved in 200 milliliters of benzene. The mixture is slowly warmed to the boiling point of benzene (80.3° C.) and refluxed for about 15 minutes. The benzene is distilled off and the N-($\alpha,\alpha,\alpha$-trifluoro-o-tolyl) P,P,P-trimethyl phosphine imide product, having a molecular weight of 235, is then recrystallized from a 1:1 mixture of benzene and hexane.

EXAMPLE 6

N-($\alpha,\alpha,\alpha$-trifluoro-o-tolyl)-P,P,P-tributyl phosphine imide 10.1 grams (0.05 mole) of tributyl phosphine and 9.35 grams (0.05 mole) of o-($\alpha,\alpha,\alpha$-trifluoromethyl)azidobenzene are mixed in 200 milliliters of benzene. The solution turns dark on mixing with the evolution of $N_2$ gas. The reaction time is about 10 minutes. The solvent is distilled off with a dark oil remaining. This oil is distilled under reduced pressure to obtain the N-($\alpha,\alpha,\alpha$-trifluoro-o-tolyl) P,P,P-tributyl phosphine imide product having a molecular weight of 431.

EXAMPLE 7

N-(p-fluorophenyl)-P,P,P-tributyl phosphine imide 6.85 grams (0.05 mole) of p-fluoroazidobenzene and 10.1 grams (0.05 mole) of tributyl phosphine are dissolved in 150 milliliters of benzene. A vigorous reaction starts at room temperature and is complete in 10 minutes. The benzene is removed by distillation at atmospheric pressure. The residue, a dark oil, is distilled under reduced presure to obtain the N-(p-fluorophenyl)-P,P,P-tributyl phosphine imide product having a molecular weight of 311. The product is a yellow liquid having a boiling point of 193° C. at 2 mm. of mercury and was obtained in a yield of 93.3 percent. The product was further found by analysis to have carbon, hydrogen and nitrogen contents of 69.0, 9.7 and 4.66 percent, respectively, as compared with the theoretical contents of 69.4, 10.0 and 4.5 percent, respectively, calculated for the named structure.

The compounds of the present invention are useful as plant growth retarders, that is, they may be employed to control the undesired growth of plants and plant parts. The term "plant and plant parts" is inclusive of terrestrial and fungal plants and their parts such as spores, mycelia, branches, roots, foliage and germinant seeds. In such use, the compounds are advantageously employed in controlling, inhibiting and arresting the growth of undesirable plants and weed seeds. In addition, the compounds and compositions thereof may be used to eradicate the lower or parasitic plants such as fungi.

For the above uses, the compounds can be employed in an unmodified form or dispersed on a finely divided solid and employed as a dust. Such mixtures can also be dispersed in water with or without the aid of a surface-active agent and the resulting aqueous suspension employed as a spray. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

The particular combination or composition to be employed will be guided by the particular results to be accomplished and is readily determined by those skilled in the art. The above compositions may be applied to the aerial portions of plants, to plant parts, to soil, to water adjacent to aquatic plants or to other natural or artificial plant growth media.

Excellent results are obtained with methods employing and compositions, containing growth-retarding amounts or concentrations of the novel compounds of this invention. Effective pre-emergence and post-emergence growth control of terrestrial plants in soil may be achieved by the administration of as little as about two pounds of the novel compound per acre. The upper limit is primarily a matter of economic practicability and is usually about 25 to 50 pounds per acre.

Effective control of fungal plants may be achieved when the novel compounds of the invention are applied to fungi or fungal growth media in amounts of from about 100 to about 1000 parts per million by weight of the active compound.

In a representative operation, the compounds of the present invention were tested for their activity as plant growth retarders for fungal plants. Separate suspensions of each compound were prepared by adding the compound to isopropanol and then diluting each individual mixture to a concentration of about 500 parts by weight of active compound per million parts of melted nutrient agar. The resultant treated nutrient was poured into petri dishes and allowed to solidify. The compounds of the invention were the sole toxicant therein. A check dish was also prepared from the nutrient agar containing none of the toxicant. Droplets of a number of test organism cultures are applied to the surface of each agar dish. The cultures are then incubated for about 48 hours under conditions conducive to growth of the test organisms.

In such operations, N-(α,α,α-trifluoro-m-tolyl)-P,P,P-tributyl phosphine imide and N-(p-fluorophenyl)-P,P,P-tributyl phosphine imide were found to give 100 percent inhibition of the growth of *Trichophyton mentagrophytes*. In further representative operations, N-(o-nitrophenyl)-P,P,P-tri-n-butyl phosphine imide was found to give 100 percent growth inhibition of *Trichophyton mentagrophytes, Aspergillus terreus and Pullularia pullulans*. In each case, the check nutrient agar supported a heavy growth of the test organisms.

In another representative operation, separate aqueous suspensions of individual test compounds were prepared containing about 600 p.p.m. of one of the compounds as the sole toxicant therein by mixing the compound with acetone and a wetting agent and diluting each individual mixture with water until the above concentration was reached. Individual host plants were thoroughly wetted with the suspension and thereafter inoculated with the fungal pathogens, rice blast organism and bean mildew. Check plants which had not been treated with a toxicant were also inoculated with the same pathogens. The plants were maintained under conditions conducive to growth of the disease until the disease symptoms were well developed on the check plants. In such an operation, each of the compounds N - (α,α,α - trifluoro-m-tolyl)-P,P,P-tributyl phosphine imide, N - (m - fluorophenyl) - P,P,P-tributyl phosphine imide and N-(o-nitrophenyl)-P,P,P-tributyl phosphine imide were found to give 100 percent growth inhibition of the pathogens.

In another representative operation, the compounds of the present invention were tested for their activity in the inhibiion of growth of terrestrial plants. Seeds of test plants were planted in soil of good nutrient content. An aqueous suspension of individual test compounds was prepared and applied as a soil drench in an amount to give a dosage of about 25 pounds of one of the compounds per acre. At the same time, a check plot of the test plants was maintained which had not been treated with the compounds.

In such operations, N-(α,α,α-trifluoro-m-tolyl)-P,P,P-tributyl phosphine imide was found to give 100 percent inhibition of the growth of such plants as pigweed, wild mustard, yellow foxtail, spiny clotbur, bindweed and barnyard grass and excellent control (up to 95 percent) of the growth of plants such as morning glory; N-(p-fluorophenyl)-P,P,P-tributyl phosphine imide was found to give excellent growth control of pigweed, wild mustard, spiny clotbur, morning glory, yellow foxtail, Japanese millet, barnyard grass and Johnson grass; N-(o-nitrophenyl)-P,P,P-tributyl phosphine imide was found to give 100 percent control of morning glory, bindweed, barnyard grass and spiny clotbur and excellent inhibition (up to 95 percent) of plants such as Chinese elm, wild mustard, pigweed and yellow foxtail; and N-(m-fluorophenyl)-P,P,P-tributyl phosphine imide was found to give excellent control of the growth of pigweed, wild mustard, spiny clotbur, morning glory, yellow foxtail and barnyard grass. The check plot was found to have profuse plant growth of all of the above-named plants.

The 2,4-dinitroazidobenzene employed as a starting material as herein described was prepared by reacting 2,4-dinitrochlorobenzene with sodium azide in a solvent mixture of acetone, methyl alcohol and water. The reaction readily takes place upon the mixing of the reactants, with the reaction mixture being maintained between about 0° C. and room temperature. Good results are obtained when employing the azide and the chloro-benzene reagent in substantially equimolecular proportions. For best results, the two reactants are separately dissolved in the solvent mixture and the azide solution is added slowly with stirring to the chlorobenzene solution. Upon completion of the reaction, the reaction mixture is poured into ice water to precipitate the 2,4-dinitroazidobenzene. This product may be further purified by conventional procedures.

The mono-substituted azidobenzenes employed as starting materials as above described are prepared by mixing at 0° C. the appropriate substituted aniline dissolved in acetic acid with $NaNO_2$ dissolved in $H_2SO_4$. The reaction mixture is brought to room temperature and maintained until the reaction is complete. The product is then mixed with $NH_2OH \cdot H_2SO_4$ with vigorous mixing. The reaction mixture is then steam distilled to recover the monosubstituted azidobenzene.

The trialkyl phosphines are commercial products and are prepared by reacting an alkyl magnesium halide with a phosphorus trihalide employing conventional reaction procedures.

What is claimed is:
1. A compound corresponding to the formula

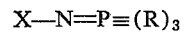

wherein R represents an alkyl group of 1–4 carbon atoms and X represents an α,α,α-trifluorotolyl or fluorophenyl radical.

2. A compound according to claim 1 wherein the compound is N-(p-fluorophenyl)-P,P,P-tributyl phosphine imide.

3. A compound according to claim 1 wherein the compound is N-(α,α,α-trifluoro-m-tolyl)-P,P,P-tributyl phosphine imide.

4. A compound according to claim 1 wherein the compound is N-(m-fluorophenyl)-P,P,P-tributyl phosphine imide.

References Cited

Lutskii et al., articles, Chemical Abstracts, vol. 68, #34387a (Feb. 19, 1968).

HENRY R. JILES, Primary Examiner

H. I. MOATZ, Assistant Examiner

U.S. Cl. X.R.

71—86